(12) United States Patent
Footitt et al.

(10) Patent No.: US 6,637,072 B2
(45) Date of Patent: Oct. 28, 2003

(54) CASTORED BASE FOR AN OFFICE CHAIR

(75) Inventors: Ian Colin Footitt, Upper Hutt (NZ); Paul Michael Wilkinson, Wellington (NZ)

(73) Assignee: Formway Furniture Limited, Wellington (NZ)

( * ) Notice: Subject to any disclaimer, the term of this patent is extended or adjusted under 35 U.S.C. 154(b) by 0 days.

(21) Appl. No.: 09/953,851

(22) Filed: Sep. 17, 2001

(65) Prior Publication Data
US 2002/0038843 A1 Apr. 4, 2002

(30) Foreign Application Priority Data

Sep. 29, 2000 (AU) .............................. PR0544

(51) Int. Cl.⁷ .............................. A47B 91/06
(52) U.S. Cl. .............................. 16/42 T; 16/47; 16/43; 248/188.7
(58) Field of Search .............................. 16/47, 48, 35 R, 16/42 T, 43; 248/188.7, 161, 519, 404, 158; 188/1.12, 31, 69; 297/411, 411.2, 411.36, 300, 301, 317, 318, 322, 323

(56) References Cited

U.S. PATENT DOCUMENTS

| 226,082 A | 3/1880 | Lemman |
| 272,579 A | 2/1883 | Paulding |
| 323,060 A | 7/1885 | Moore |
| 614,235 A | 11/1898 | Palmer |
| 662,247 A | 11/1900 | Vinton |
| 662,647 A | 11/1900 | Howe |
| 1,120,686 A | 12/1914 | Burrowes |
| 1,976,793 A | 10/1934 | Mangold |
| 2,071,974 A | 2/1937 | Gunlocke |
| 2,471,024 A | 5/1949 | Cramer |
| 2,590,995 A | 4/1952 | Merrill |
| 2,612,211 A | 9/1952 | Gielow et al. |
| 2,796,918 A | 6/1957 | Luckhardt |
| 2,804,129 A | 8/1957 | Propst |
| 2,833,339 A | 5/1958 | Liljengren |

(List continued on next page.)

FOREIGN PATENT DOCUMENTS

| AU | 12435-70 | 9/1971 |
| AU | 36754-93 | 1/1994 |

(List continued on next page.)

*Primary Examiner*—Chuck Y. Mah
(74) *Attorney, Agent, or Firm*—Workman Nydegger

(57) ABSTRACT

A castored base (18) for an office chair includes a plurality of radially extending legs (300), each leg having a socket or sleeve (308) fixed thereto adjacent an outer end thereof. A castor (302/402) is connected to each socket or sleeve (308), each castor having two wheel portions (312/412) and an axle assembly (316/404). The axle assembly includes an axle (314/414) to which the two wheel portions are rotatably mounted in spaced disposition and including a pin (318/418), wherein the pin (318/418) of each castor is received in a respective socket or sleeve (308) which extends at least in part between the two wheel portions (312/412). Only a small clearance is required between the underside of the legs (300) and the tops of the castors (302/402). Further, low profile legs (300) may be used in the base (18), while still providing the required strength and stability.

28 Claims, 9 Drawing Sheets

U.S. PATENT DOCUMENTS

| | | | |
|---|---|---|---|
| 2,845,997 A | 8/1958 | Waite | |
| 2,858,572 A | 11/1958 | Burdick | |
| 2,887,692 A | 5/1959 | Gosman | |
| 2,962,764 A | 12/1960 | Trojanowski et al. | |
| 3,009,578 A | 11/1961 | Foote et al. | |
| 3,015,148 A | 1/1962 | Haddad | |
| 3,030,640 A | 4/1962 | Gosman | |
| 3,040,370 A * | 6/1962 | Ford | 16/31 R |
| 3,041,109 A | 6/1962 | Eames et al. | |
| 3,107,991 A | 10/1963 | Taussig | |
| 3,112,987 A | 12/1963 | Griffiths et al. | |
| 3,115,678 A | 12/1963 | Keen et al. | |
| 3,124,092 A | 3/1964 | Raynes | |
| 3,165,359 A | 1/1965 | Ashkouti | |
| 3,208,085 A | 9/1965 | Grimshaw | |
| 3,214,314 A | 10/1965 | Rowbottam | |
| 3,222,698 A | 12/1965 | Levenson | |
| 3,273,877 A | 9/1966 | Geller et al. | |
| 3,298,743 A | 1/1967 | Albinson et al. | |
| 3,301,931 A | 1/1967 | Morin | |
| 3,314,721 A | 4/1967 | Smith | |
| 3,319,274 A | 5/1967 | Upton | |
| 3,399,883 A | 9/1968 | McKey | |
| 3,399,926 A | 9/1968 | Hehn | |
| 3,431,022 A | 3/1969 | Poppe et al. | |
| 3,434,181 A | 3/1969 | Benzies | |
| 3,534,129 A | 10/1970 | Bartel | |
| 3,546,724 A | 12/1970 | Bastos et al. | |
| 3,577,620 A | 5/1971 | Hoffman et al. | |
| 3,589,967 A | 6/1971 | Shirakawa | |
| 3,620,568 A | 11/1971 | Morrow | |
| 3,652,126 A | 3/1972 | Folling | |
| 3,699,609 A | 10/1972 | Spatz | |
| 3,705,704 A * | 12/1972 | Textoris | 248/188.7 |
| 3,712,666 A | 1/1973 | Stoll | |
| 3,740,792 A | 6/1973 | Werner | |
| 3,744,083 A | 7/1973 | Jenkins | |
| 3,757,383 A | 9/1973 | Iiyoshi | |
| 3,770,235 A | 11/1973 | Klapproth et al. | |
| 3,826,456 A | 7/1974 | Tranter et al. | |
| 3,874,749 A | 4/1975 | Maniak | |
| 3,894,310 A * | 7/1975 | Screen et al. | 16/47 |
| 3,922,754 A * | 12/1975 | Andersen | 16/18 A |
| 3,937,518 A | 2/1976 | Harrison | |
| 3,942,835 A | 3/1976 | Harrison | |
| 3,950,026 A | 4/1976 | Van Seenus | |
| 3,974,532 A | 8/1976 | Ecchuya | |
| 3,997,938 A * | 12/1976 | Pinaire et al. | 16/45 |
| 4,017,118 A | 4/1977 | Cawley | |
| 4,040,661 A | 8/1977 | Hogan et al. | |
| 4,043,592 A | 8/1977 | Fries | |
| 4,054,317 A | 10/1977 | Stumpf | |
| 4,077,088 A * | 3/1978 | Melara | 16/18 CG |
| 4,107,817 A | 8/1978 | Sloan et al. | |
| 4,120,071 A * | 10/1978 | Crescenzi | 16/37 |
| 4,122,568 A | 10/1978 | Bastos et al. | |
| 4,123,104 A | 10/1978 | Andres et al. | |
| 4,143,910 A | 3/1979 | Geffers et al. | |
| 4,145,020 A | 3/1979 | Webster | |
| 4,154,478 A | 5/1979 | Cohune | |
| 4,158,899 A | 6/1979 | Budimirov | |
| 4,159,148 A | 6/1979 | Schulz | |
| 4,161,803 A * | 7/1979 | Propst et al. | 16/18 A |
| 4,173,810 A * | 11/1979 | James | 16/47 |
| 4,191,422 A | 3/1980 | Inasawa et al. | |
| 4,196,493 A * | 4/1980 | Propst et al. | 16/18 A |
| 4,202,581 A | 5/1980 | Fleishman | |
| 4,203,177 A | 5/1980 | Kegg et al. | |
| 4,205,878 A | 6/1980 | Wooten | |
| 4,262,871 A * | 4/1981 | Kolk et al. | 16/18 CG |
| 4,265,482 A | 5/1981 | Nishimura et al. | |
| 4,283,810 A * | 8/1981 | Demrick | 16/47 |
| 4,285,545 A | 8/1981 | Protze | |
| 4,345,733 A | 8/1982 | Ambasz et al. | |
| 4,353,595 A | 10/1982 | Kaneko et al. | |
| 4,377,883 A * | 3/1983 | Folson | 16/38 |
| 4,380,352 A | 4/1983 | Diffrient | |
| 4,390,204 A | 6/1983 | Fleishman | |
| 4,390,206 A | 6/1983 | Faiks et al. | |
| 4,400,032 A | 8/1983 | dePolo | |
| 4,402,108 A | 9/1983 | Pannwitz | |
| 4,406,496 A | 9/1983 | Drabert et al. | |
| 4,408,797 A | 10/1983 | Franck et al. | |
| 4,411,469 A | 10/1983 | Drabert et al. | |
| 4,415,203 A | 11/1983 | Cawley | |
| 4,418,958 A | 12/1983 | Watkin | |
| 4,429,917 A | 2/1984 | Diffrient | |
| 4,451,081 A | 5/1984 | Kowalski | |
| 4,466,662 A | 8/1984 | McDonald et al. | |
| 4,479,679 A | 10/1984 | Fries et al. | |
| 4,491,364 A | 1/1985 | Hattori et al. | |
| 4,496,190 A | 1/1985 | Barley | |
| 4,498,702 A | 2/1985 | Raftery | |
| 4,502,731 A | 3/1985 | Snider | |
| 4,509,793 A | 4/1985 | Wiesmann et al. | |
| 4,515,406 A | 5/1985 | Fujiyama et al. | |
| D279,635 S | 7/1985 | Aasen | |
| 4,533,174 A | 8/1985 | Fleishman | |
| 4,534,593 A | 8/1985 | Ojala | |
| 4,540,217 A | 9/1985 | Suzuki | |
| 4,544,425 A * | 10/1985 | Provolo | 156/73.1 |
| 4,552,406 A | 11/1985 | Ohl | |
| 4,555,136 A | 11/1985 | Dranger | |
| 4,560,199 A | 12/1985 | Sapper | |
| 4,570,994 A | 2/1986 | Lowrey | |
| 4,580,837 A | 4/1986 | Bayley | |
| 4,585,272 A | 4/1986 | Ballarini | |
| 4,603,830 A | 8/1986 | Franck | |
| 4,627,602 A | 12/1986 | Sporck | |
| 4,640,548 A | 2/1987 | Desanta | |
| 4,641,885 A | 2/1987 | Bräuning | |
| 4,660,887 A | 4/1987 | Fleming et al. | |
| D289,591 S | 5/1987 | Groseth | |
| 4,664,445 A | 5/1987 | Groseth | |
| 4,685,730 A | 8/1987 | Linguanotto | |
| 4,689,847 A | 9/1987 | Huber | |
| 4,691,961 A | 9/1987 | Rogers, Jr. et al. | |
| 4,693,515 A | 9/1987 | Russo et al. | |
| 4,703,974 A | 11/1987 | Bräuning | |
| 4,711,491 A | 12/1987 | Ginat | |
| 4,713,854 A | 12/1987 | Graebe | |
| 4,719,664 A * | 1/1988 | Berfield | 16/38 |
| 4,720,146 A | 1/1988 | Mawbey et al. | |
| 4,730,871 A | 3/1988 | Sheldon | |
| 4,733,910 A | 3/1988 | Brennan | |
| 4,752,101 A | 6/1988 | Yurchenco et al. | |
| 4,758,045 A | 7/1988 | Edel et al. | |
| D296,959 S | 8/1988 | Gusrud | |
| 4,761,033 A | 8/1988 | Lanuzzi et al. | |
| 4,765,679 A | 8/1988 | Lanuzzi et al. | |
| 4,776,633 A | 10/1988 | Knoblock et al. | |
| 4,778,218 A | 10/1988 | Suman | |
| 4,796,952 A | 1/1989 | Piretti | |
| 4,811,986 A | 3/1989 | Hattori et al. | |
| 4,823,417 A | 4/1989 | Fukuichi | |
| 4,830,430 A | 5/1989 | Schäfer | |
| 4,848,837 A | 7/1989 | Völkle | |
| 4,848,838 A | 7/1989 | McCrackin et al. | |
| 4,852,943 A | 8/1989 | Roper | |
| 4,863,218 A | 9/1989 | McCrackin | |
| 4,869,448 A | 9/1989 | Kenyon | |

| | | | | | | |
|---|---|---|---|---|---|---|
| 4,869,552 A | 9/1989 | Tolleson et al. | | 5,454,536 A | * 10/1995 | Melhuish ............... 248/188.7 |
| 4,871,208 A | 10/1989 | Hodgdon | | 5,486,035 A | 1/1996 | Koepke et al. |
| 4,881,777 A | 11/1989 | Dorshimer | | 5,505,521 A | 4/1996 | Meiller et al. |
| 4,889,385 A | 12/1989 | Chadwick et al. | | 5,524,966 A | 6/1996 | Piretti |
| 4,909,472 A | 3/1990 | Piretti | | 5,542,743 A | 8/1996 | Olson et al. |
| 4,914,836 A | 4/1990 | Horovitz | | 5,547,252 A | 8/1996 | Pfenniger |
| 4,915,449 A | 4/1990 | Piretti | | 5,558,399 A | 9/1996 | Serber |
| 4,962,962 A | 10/1990 | Machate et al. | | 5,560,438 A | 10/1996 | Collee et al. |
| 4,965,899 A | 10/1990 | Sekido et al. | | 5,560,439 A | 10/1996 | Delwiche et al. |
| 4,981,326 A | 1/1991 | Heidmann | | 5,562,324 A | 10/1996 | Massara et al. |
| 4,988,145 A | 1/1991 | Engel | | 5,567,010 A | 10/1996 | Sparks |
| 4,996,738 A | 3/1991 | Tifre | | 5,567,011 A | 10/1996 | Sessini |
| 5,001,808 A | 3/1991 | Chung | | 5,575,534 A | 11/1996 | Yu |
| 5,009,466 A | 4/1991 | Perry | | 5,577,807 A | 11/1996 | Hodge et al. |
| 5,013,272 A | 5/1991 | Watkins | | 5,580,127 A | 12/1996 | Piretti |
| 5,015,034 A | 5/1991 | Kindig et al. | | 5,584,533 A | 12/1996 | Schrewe |
| 5,022,709 A | 6/1991 | Marchino | | 5,586,810 A | 12/1996 | Liu |
| 5,024,484 A | 6/1991 | Buchacz | | 5,595,806 A | 1/1997 | Korfmacher |
| 5,026,120 A | 6/1991 | Takeda et al. | | 5,597,208 A | 1/1997 | Bonutti |
| 5,029,822 A | 7/1991 | Selzer | | 5,613,736 A | 3/1997 | Schaked et al. |
| 5,039,567 A | 8/1991 | Landi et al. | | 5,617,595 A | 4/1997 | Landi et al. |
| 5,044,027 A | 9/1991 | Moon | | 5,630,647 A | 5/1997 | Heidmann et al. |
| 5,044,030 A | 9/1991 | Balaton | | 5,637,076 A | 6/1997 | Hazard et al. |
| 5,046,780 A | 9/1991 | Decker et al. | | 5,645,317 A | 7/1997 | Onishi et al. |
| 5,050,931 A | 9/1991 | Knoblock | | 5,647,638 A | 7/1997 | Ritt et al. |
| 5,050,933 A | 9/1991 | Tornero et al. | | 5,649,740 A | 7/1997 | Hodgdon |
| 5,052,068 A | 10/1991 | Graebe | | 5,667,277 A | 9/1997 | Van De Riet |
| 5,052,753 A | 10/1991 | Buchacz | | 5,669,665 A | 9/1997 | Nowak |
| 5,076,643 A | 12/1991 | Colasanti et al. | | 5,678,891 A | 10/1997 | O'Neill et al. |
| 5,080,430 A | 1/1992 | Castro | | 5,704,688 A | 1/1998 | Schrewe et al. |
| 5,100,201 A | 3/1992 | Becker, III et al. | | 5,711,575 A | 1/1998 | Hand et al. |
| 5,101,811 A | 4/1992 | Brunswick | | 5,713,631 A | 2/1998 | O'Neill et al. |
| 5,102,196 A | 4/1992 | Kaneda et al. | | D392,875 S | 3/1998 | Scott |
| 5,108,150 A | 4/1992 | Stas et al. | | 5,725,277 A | 3/1998 | Knoblock |
| 5,113,540 A | 5/1992 | Sereboff | | 5,749,628 A | 5/1998 | Synder et al. |
| 5,119,525 A | * 6/1992 | Melara ..................... 16/18 R | | 5,752,684 A | * 5/1998 | Larkin ..................... 248/188.1 |
| 5,121,934 A | 6/1992 | Decker et al. | | 5,765,804 A | 6/1998 | Stumpf et al. |
| 5,137,329 A | 8/1992 | Neale | | 5,765,914 A | 6/1998 | Britain et al. |
| 5,144,708 A | 9/1992 | Pekar | | 5,772,282 A | 6/1998 | Stumpf et al. |
| 5,149,035 A | * 9/1992 | Bonnema et al. ........ 248/188.7 | | 5,775,774 A | 7/1998 | Okano |
| 5,171,209 A | 12/1992 | Gamba | | 5,791,733 A | 8/1998 | van Hekken et al. |
| 5,172,436 A | 12/1992 | Masuda | | 5,791,735 A | 8/1998 | Helman |
| 5,190,348 A | 3/1993 | Colasanti | | 5,791,736 A | 8/1998 | Herbert |
| 5,195,199 A | 3/1993 | Sereboff | | 5,797,652 A | 8/1998 | Darbyshire |
| 5,251,958 A | 10/1993 | Roericht et al. | | 5,806,927 A | 9/1998 | Schneider |
| 5,274,879 A | 1/1994 | Haussels | | 5,810,439 A | 9/1998 | Roslund, Jr. |
| 5,288,134 A | 2/1994 | Hewko et al. | | 5,823,619 A | 10/1998 | Heilig et al. |
| D345,060 S | 3/1994 | Duncan | | 5,826,940 A | 10/1998 | Hodgdon |
| 5,292,097 A | 3/1994 | Russell | | 5,839,786 A | 11/1998 | Cvek |
| 5,304,271 A | 4/1994 | Gusakov | | 5,845,964 A | 12/1998 | Phoon |
| 5,308,028 A | 5/1994 | Kornberg | | 5,853,223 A | 12/1998 | Ritt et al. |
| 5,308,145 A | 5/1994 | Koepke et al. | | 5,860,699 A | 1/1999 | Weeks |
| 5,314,235 A | 5/1994 | Johnson | | 5,860,701 A | 1/1999 | Jungjohann et al. |
| 5,314,237 A | 5/1994 | Koepke et al. | | 5,868,466 A | 2/1999 | Massara et al. |
| 5,314,240 A | 5/1994 | Ishi et al. | | 5,868,467 A | 2/1999 | Moll |
| 5,320,409 A | 6/1994 | Katoh et al. | | 5,871,258 A | 2/1999 | Battey et al. |
| 5,330,255 A | 7/1994 | Stawicki | | 5,890,245 A | 4/1999 | Klearman et al. |
| 5,340,191 A | 8/1994 | May | | 5,902,011 A | 5/1999 | Hand et al. |
| 5,346,283 A | 9/1994 | Steininger et al. | | 5,904,397 A | 5/1999 | Fismen |
| 5,348,372 A | 9/1994 | Takamatsu et al. | | 5,906,343 A | 5/1999 | Battey et al. |
| 5,348,415 A | 9/1994 | Carlsson | | 5,909,923 A | 6/1999 | DeKraker |
| 5,354,120 A | 10/1994 | Völkle | | 5,909,924 A | 6/1999 | Roslund, Jr. |
| 5,372,487 A | 12/1994 | Pekar | | 5,918,940 A | 7/1999 | Wakamatsu et al. |
| 5,388,892 A | 2/1995 | Tornero | | 5,927,804 A | 7/1999 | Cuevas |
| 5,401,077 A | 3/1995 | Hosoe | | 5,927,811 A | 7/1999 | Tseng |
| 5,412,838 A | 5/1995 | Yang | | 5,931,531 A | 8/1999 | Assmann |
| 5,417,473 A | 5/1995 | Bräuning | | 5,931,536 A | 8/1999 | Wu |
| 5,419,617 A | 5/1995 | Schultz | | 5,931,537 A | 8/1999 | Gollin et al. |
| 5,439,267 A | 8/1995 | Peterson et al. | | 5,934,749 A | 8/1999 | Pond et al. |
| 5,444,881 A | 8/1995 | Landi et al. | | 5,934,758 A | 8/1999 | Ritch et al. |
| 5,452,937 A | 9/1995 | Piretti | | 5,938,156 A | * 8/1999 | Kao ..................... 248/188.7 |

| | | | | | | |
|---|---|---|---|---|---|---|
| D413,875 S | 9/1999 | Lawrence | | DE | 43 17 601 A1 | 12/1994 |
| 5,951,109 A | 9/1999 | Roslund, Jr. et al. | | DE | 94 14 023 | 2/1995 |
| 5,954,393 A | 9/1999 | Perrin | | DE | 295 02 429 U1 | 12/1995 |
| 5,957,534 A | 9/1999 | Wilkerson et al. | | DE | 297 06 901 U1 | 7/1997 |
| 5,964,503 A | 10/1999 | Inoue | | DE | 196 03 789 A1 | 8/1997 |
| 5,967,608 A | 10/1999 | Van Sickle | | DE | 197 16 347 A1 | 10/1998 |
| 5,967,613 A | 10/1999 | McKeever | | DE | 198 48 400 A1 | 5/2000 |
| 5,971,481 A | 10/1999 | Emmenegger et al. | | EP | 0 032 839 A2 | 7/1981 |
| 5,975,632 A | 11/1999 | Ginat | | EP | 0 154 582 A2 | 9/1985 |
| 5,975,634 A | 11/1999 | Knoblock et al. | | EP | 0 164 266 A2 | 11/1985 |
| 5,975,636 A | 11/1999 | Koch et al. | | EP | 0 164 267 A2 | 12/1985 |
| 5,975,637 A | 11/1999 | Geuss et al. | | EP | 0171564 * | 2/1986 |
| 5,975,639 A | 11/1999 | Wilson et al. | | EP | 0 216 578 A2 | 4/1987 |
| 5,979,984 A | 11/1999 | DeKraker et al. | | EP | 0 249 584 A2 | 12/1987 |
| D417,793 S | 12/1999 | Ritch et al. | | EP | 0 277 912 A1 | 8/1988 |
| 5,997,094 A | 12/1999 | Cvek | | EP | 0331104 A1 * | 9/1989 |
| 6,010,189 A | 1/2000 | Hybarger et al. | | EP | 0 338 050 B1 | 10/1989 |
| 6,015,187 A | 1/2000 | Roslund, Jr. et al. | | EP | 0 499 594 A1 | 8/1992 |
| 6,022,078 A | 2/2000 | Chang | | EP | 0 383 890 | 1/1993 |
| 6,027,169 A | 2/2000 | Roslund, Jr. | | EP | 0 560 736 A1 | 9/1993 |
| 6,030,041 A | 2/2000 | Hsiao | | EP | 0 561 518 A1 | 9/1993 |
| 6,035,901 A | 3/2000 | Stumpf et al. | | EP | 0 587 537 A1 | 3/1994 |
| 6,039,397 A | 3/2000 | Ginat | | EP | 0 589 834 A1 | 3/1994 |
| D423,261 S | 4/2000 | Ritch et al. | | EP | 0 591 932 A1 | 4/1994 |
| 6,045,183 A | 4/2000 | Weber | | EP | 0 591 933 A1 | 4/1994 |
| 6,053,574 A | 4/2000 | Opsvik | | EP | 0 741 985 A1 | 11/1996 |
| 6,056,360 A | 5/2000 | Schneider | | EP | 0 801 913 A1 | 10/1997 |
| 6,059,363 A | 5/2000 | Roslund, Jr. et al. | | EP | 0 857 443 A2 | 8/1998 |
| 6,059,368 A | 5/2000 | Stumpf et al. | | EP | 0 880 921 A2 | 12/1998 |
| 6,059,370 A | 5/2000 | Kanyer et al. | | EP | 0 885 575 A2 | 12/1998 |
| 6,062,646 A | 5/2000 | Bock | | EP | 0 958 765 A2 | 11/1999 |
| 6,076,892 A | 6/2000 | van Hekken et al. | | EP | 0 960 586 A2 | 12/1999 |
| 6,079,785 A | 6/2000 | Peterson et al. | | EP | 1 013 198 A2 | 6/2000 |
| 6,086,153 A | 7/2000 | Heidmann et al. | | EP | 1 033 098 A1 | 9/2000 |
| 6,098,000 A | 8/2000 | Long et al. | | EP | 1 044 634 A1 | 10/2000 |
| 6,106,070 A | 8/2000 | Ritt et al. | | EP | 1 059 051 A1 | 12/2000 |
| 6,116,555 A * | 9/2000 | Claus et al. ............... 248/161 | | EP | 1 106 110 A1 | 6/2001 |
| 6,116,688 A | 9/2000 | Wilkerson et al. | | FR | 2 558 360 | 7/1985 |
| 6,120,096 A | 9/2000 | Miotto | | FR | 2 586 180 | 2/1987 |
| 6,120,099 A | 9/2000 | Reikerås et al. | | FR | 2 586 541 | 3/1987 |
| 6,129,419 A | 10/2000 | Neale | | FR | 2 641 453 | 7/1990 |
| 6,139,106 A | 10/2000 | Aldridge | | GB | 1 222 908 | 2/1971 |
| D433,854 S | 11/2000 | Diffrient | | GB | 2 057 257 A | 4/1981 |
| 6,149,231 A | 11/2000 | Wüstholz | | GB | 2 068 717 A | 8/1981 |
| 6,149,236 A | 11/2000 | Bräuning | | GB | 1 603 355 | 11/1981 |
| D435,746 S | 1/2001 | Diffrient | | GB | 1 603 356 | 11/1981 |
| D436,457 S | 1/2001 | Ambasz | | GB | 2081085 * | 2/1982 |
| D436,749 S | 1/2001 | Arad | | GB | 2 107 576 A | 5/1983 |
| 6,168,239 B1 | 1/2001 | Conner et al. | | GB | 2 165 445 A | 4/1986 |
| 6,174,031 B1 | 1/2001 | Lindgren et al. | | GB | 2 189 990 A | 11/1987 |
| 6,176,548 B1 | 1/2001 | Thole et al. | | GB | 2 232 884 A | 1/1991 |
| D437,497 S | 2/2001 | Bräuning | | GB | 2 255 008 A | 10/1992 |
| D437,701 S | 2/2001 | Bellini et al. | | GB | 2 255 277 A | 11/1992 |
| 6,182,315 B1 | 2/2001 | Lee | | JP | 07257104 A * | 3/1994 |
| 6,186,594 B1 | 2/2001 | Valiquette et al. | | JP | 11301205 A * | 11/1999 |
| 6,192,565 B1 | 2/2001 | Tame | | JP | 200052705 A * | 2/2000 |
| D440,068 S | 4/2001 | Bräuning | | JP | 2000225804 A * | 8/2000 |
| 6,209,958 B1 | 4/2001 | Thole | | NZ | 184194 | 2/1981 |
| 6,279,184 B1 | 8/2001 | George, II | | WO | WO 80/02791 | 12/1980 |
| 6,286,900 B1 | 9/2001 | Roark | | WO | WO 87/04909 | 8/1987 |
| 6,290,295 B1 | 9/2001 | Benden et al. | | WO | WO 89/03648 | 5/1989 |
| 6,295,674 B1 | 10/2001 | Smith-McKelvey et al. | | WO | WO 90/00871 | 2/1990 |
| 6,296,308 B1 | 10/2001 | Cosentino et al. | | WO | WO 90/02504 | 3/1990 |
| 6,425,161 B1 | 7/2002 | LeMeur, Jr. et al. | | WO | WO 91/03969 | 4/1991 |
| 2001/0000939 A1 | 5/2001 | Roslund, Jr. et al. | | WO | WO 92/03073 | 3/1992 |
| | | | | WO | WO 92/06622 | 4/1992 |
| FOREIGN PATENT DOCUMENTS | | | | WO | WO 93/03653 | 3/1993 |
| DE | 29 40 641 A1 | 4/1981 | | WO | WO 93/25121 | 12/1993 |
| DE | 30 17 163 A1 | 11/1981 | | WO | WO 94/08491 | 4/1994 |
| DE | 3117666 * | 11/1982 | | WO | WO 94/24904 | 11/1994 |
| DE | 42 16 358 A1 | 11/1992 | | WO | WO 95/00052 | 1/1995 |

| | | | | | | |
|---|---|---|---|---|---|---|
| WO | WO 96/02166 | 2/1996 | | WO | WO 98/48668 | 11/1998 |
| WO | WO 96/07344 | 3/1996 | | WO | WO 98/48670 | 11/1998 |
| WO | WO 96/39900 | 12/1996 | | WO | WO 99/21456 | 5/1999 |
| WO | WO 96/39902 | 12/1996 | | WO | WO 00/22959 | 4/2000 |
| WO | WO 96/39903 | 12/1996 | | WO | WO 00/22960 | 4/2000 |
| WO | WO 97/23152 | 7/1997 | | WO | WO 00/23027 | 4/2000 |
| WO | WO 98/02067 | 1/1998 | | WO | WO 00/24295 | 5/2000 |
| WO | WO 98/08424 | 3/1998 | | | | |
| WO | WO 98/32353 | 7/1998 | | | | |
| WO | WO 98/47413 | 10/1998 | | | | |

* cited by examiner

CASTORED BASE FOR AN OFFICE CHAIR

CROSS-REFERENCE TO RELATED APPLICATIONS

This application claims priority to Australian Application No. PR 0544, filed Sep. 28, 2000, which application is incorporated herein by specific reference.

BACKGROUND OF THE INVENTION

1. The Field of the Invention

The present invention relates to a castored base for a chair. In particular, although not exclusively, the invention relates to a castored base for an office chair having a plurality of radiating legs, each supported by a respective castor. However, the present invention is not limited in its application to office chairs. The invention may also have application to other types of chairs such as domestic chairs, and also to tables, other moveable pieces of furniture and moveable office accessories.

2. The Relevant Technology

Office chairs are commonly provided with a wheeled base in the form of a central upright support column with a plurality of legs radiating from the lower end of the support column. Each of the legs is supported at its free end by a respective castor. The castors generally have two wheel portions which are rotatably mounted about a central body. The central body is provided with an upwardly extending connector pin extending above the two wheel portions. The connector pin is received by the end of the associated leg.

It will be appreciated that having the connector pin extending upwardly from above the two wheel portions dictates that the depth of each leg to receive the pin must be at least as deep as the length of the pin. Accordingly, this creates unnecessary bulk in the size of the legs, restricting free movement of the occupant's legs under the seat portion. This is considered particularly disadvantageous since it has been found that occupants of office chairs commonly sit with their legs bent underneath the seat portion such that their feet are disposed approximately in line with their spinal column. Providing a correct posture is adopted, this is found to be a satisfactory ergonomic position. It will be appreciated that any castor arrangement which contributes to the bulk of the wheeled base, restricting free movement of the occupant' feet will be annoying to the occupant.

Accordingly, it is an object of the present invention to provide an arrangement for a castor or castored base which overcomes or at least addresses some of the abovementioned disadvantages.

BRIEF SUMMARY OF THE INVENTION

In accordance with an aspect of the present invention, there is provided a castored base for a chair including: a plurality of radially extending legs, each leg having a socket or sleeve fixed thereto adjacent an outer end thereof; and a castor connected to each socket or sleeve, each castor having two wheel portions and an axle assembly, the axle assembly including an axle to which the two wheel portions are rotatably mounted in spaced disposition and including a pin; wherein the pin of each castor is received in a respective one of the sockets or sleeves which extends at least in part between the two wheel portions.

The castored base may also be used to support a table or any other item of furniture or office accessory.

The pin may be releasably received in the respective socket or sleeve. The castored base may have a central upright support column with the plurality of legs radially extending from the lower end of the support column. Preferably, the radially extending legs extend in a substantially horizontal fashion. A small downward gradient may be incorporated as the legs extend radially outward. The legs may also incorporate a slight curve, preferably convex upwards.

In order to reduce their height, the legs are preferably of plate-like construction. Preferably, each leg incorporates a longitudinally extending strengthening web disposed on its underside. In a most preferred form of the invention, the strengthening web reduces in height in the radially outward direction along the associated leg.

Preferably, each socket or sleeve is an integrally formed part of the respective leg. Suitably, each pin is rotatably mounted within the respective socket/sleeve to rotate about an axis aligned with the longitudinal axis of the pin.

Each pin is preferably disposed centrally relative to the respective axle. Preferably, the longitudinal axis of the pin extends generally orthogonally to the longitudinal axis of the axle. The axes may be offset so that they do not intersect.

Accordingly, an intermediate portion may be provided as part of each axle assembly to extend between the axle and the pin. Preferably, the axle, the intermediate portion and the connector pin is an integrally formed component. The component may be cast, machined or forged.

Preferably, the pin in each castor is disposed substantially between the two wheel portions. Preferably, the top of the connector pin in its operable configuration extends no higher than level with the top of the wheel portions.

The axle assembly may include a body portion defining an aperture within which the axle is mounted. The body portion may include a plate having an annular boss defining the aperture, and a plurality of ribs extending radially outwardly from the boss.

Suitably, each wheel portion is circular in cross-section transverse to its rolling axis. Each wheel portion may have a rolling surface shaped as a cylinder or a hemisphere. In a most preferred form of the invention, each wheel portion has a rolling surface which is semi-ellipsoidal. In a most preferred form of the invention, each wheel portion is of solid, translucent plastic construction.

Each castor may further include a cover extending between the two wheel portions to at least partly close the gap therebetween. The cover may be an integral part of the axle assembly.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention consists in the foregoing and also envisages constructions of which the following gives examples only.

DETAILED DESCRIPTION OF THE PREFERRED EMBODIMENTS

Figure 1:
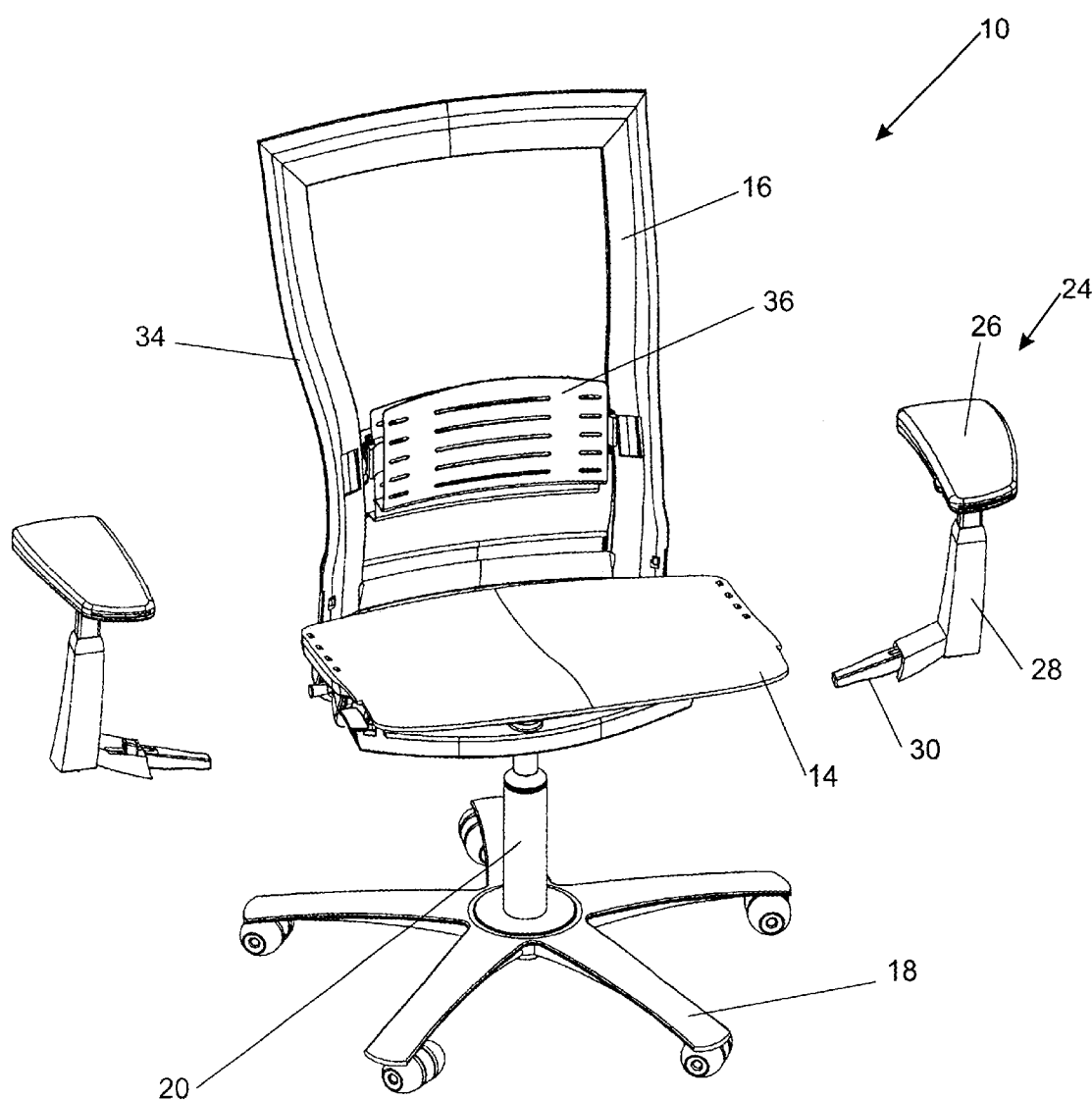
FIG. 1 is a perspective view, partly exploded, of an office chair incorporating a wheeled base in accordance with the present invention.

FIG. 1 illustrates an office chair 10 including a main assembly having a seat portion 14 and a back portion 16. The seat portion 14 and the back portion 16 are supported above the ground by a supporting frame including a wheeled base 18 and a central support column 20. The central support column 20 houses a pneumatic spring (not shown) for height adjustment of the seat portion 14 in conventional fashion. The pneumatic spring is connected to the main transom (not shown).

FIG. 1 also illustrates two detachable arm assemblies 24. The arm assemblies 24 each include an upper armrest 26 which is padded for user comfort. Each arm assembly 24 includes an upright support structure 28. The armrest 26 is mounted to the upper end of the upright support structure 28. The lower end of the upright support structure has an elongate attachment portion 30 extending inwardly therefrom at a downwardly inclined angle relative to the upright support structure 28.

The elongate attachment portion 30 is releasably engaged within one end of the main transom 22. The manner of attachment is not significant to the present invention but further disclosure relative thereto is found in U.S. patent application Ser. No. 09/953,850, filed Sep. 17, 2001, in the names of Jonathan William Prince and Paul Michael Wilkinson, and entitled Arm Assembly for a Chair, the disclosure of which is incorporated herein by specific reference.

Wheeled Base

Figure 2:
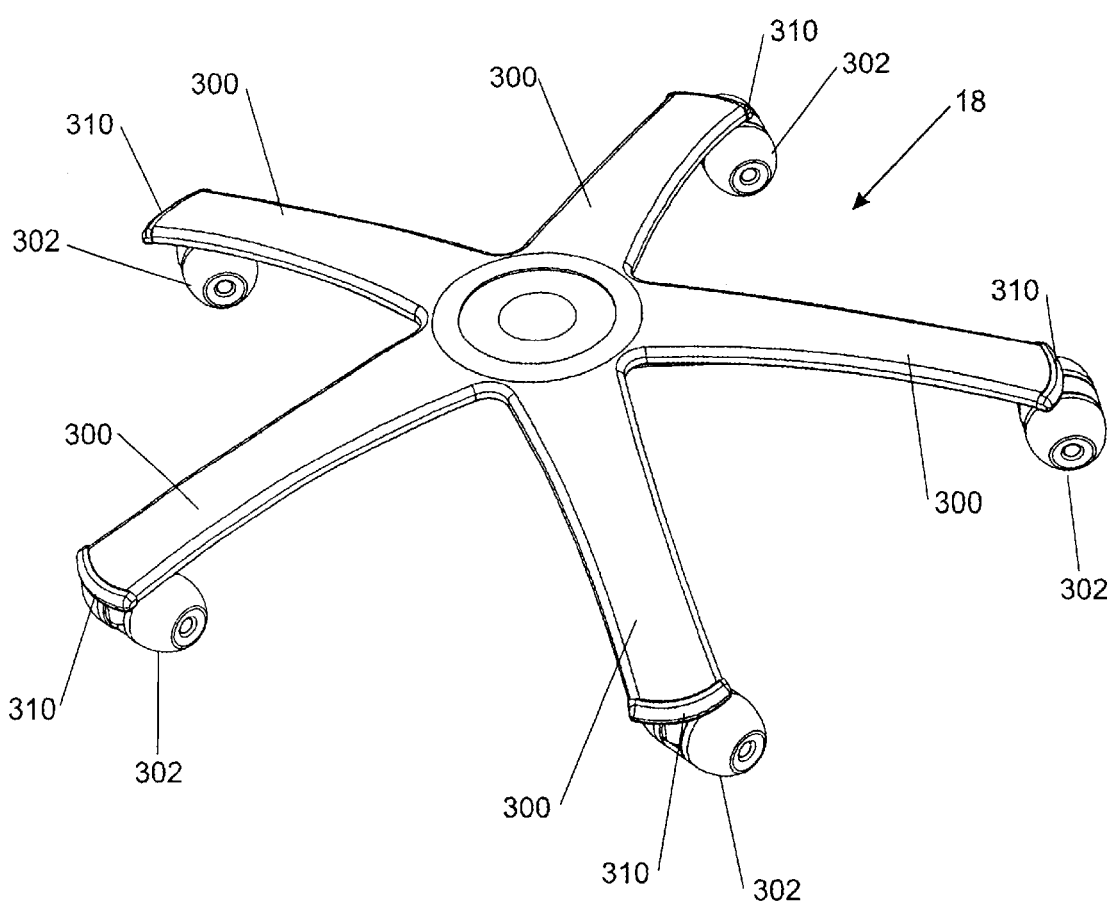
FIG. 2 is a perspective view of a preferred form of a wheeled base.
Figure 3:
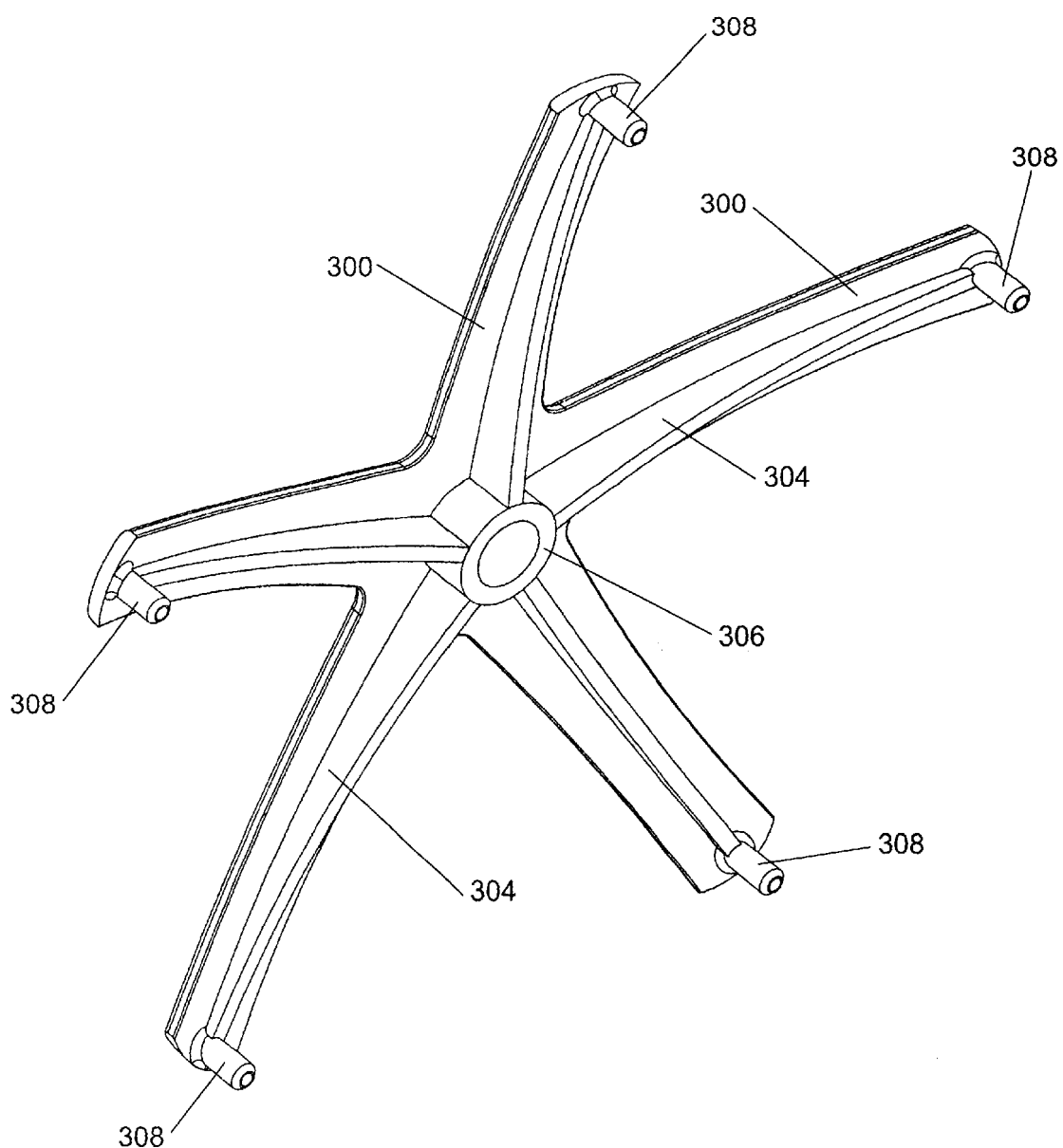
FIG. 3 is an underside perspective view of the leg assembly forming part of the wheeled base illustrated in FIG. 2.

FIG. 2 illustrates a preferred form of the wheeled base 18. The wheeled base includes five radially extending legs 300. Each of the legs is supported by a respective castor 302. As more clearly illustrated in FIG. 3, the five legs 300 make up an unitary cast leg assembly. Each leg is elongate and substantially plate-like in thickness, strengthened by a strengthening web 304 extending longitudinally along each leg 300. The strengthening webs 304 terminate at their inner ends at a centrally disposed annular boss 306. At their outer ends, each of the legs 300 is provided with an integrally formed dependent connector 308. Each dependent connector 308 is in the form of a socket or sleeve. As the legs are substantially plate-like in configuration, the end of each leg 300 terminates in a clip-on bumper 310 comprised of resilient plastic or rubber material.

Figure 4:
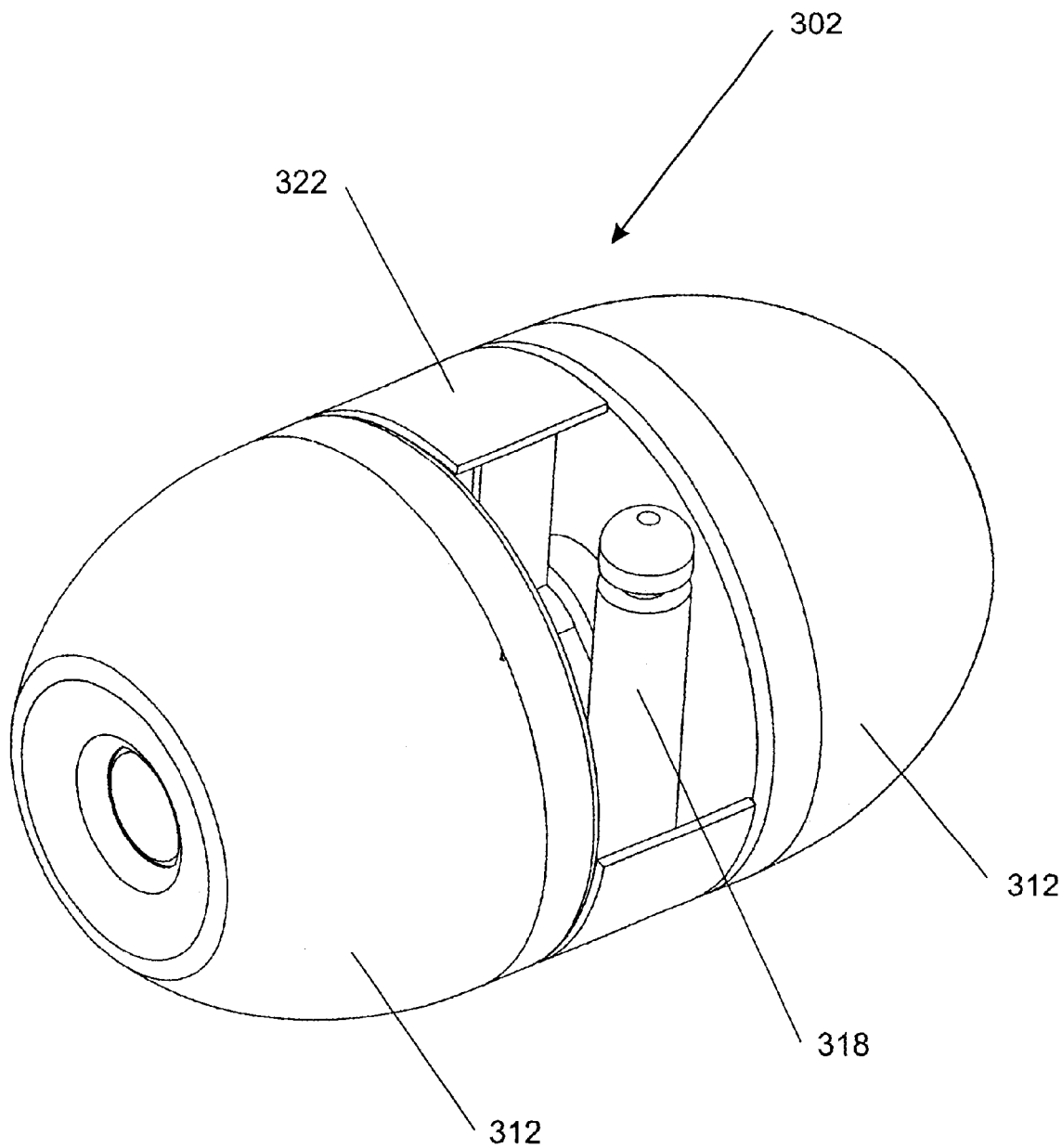
FIG. 4 is a perspective view of a castor forming part of the mobile base illustrated in FIG. 2.

FIG. 4 illustrates the form of the castor 302. Each castor 302 comprises two spaced wheel portions 312. The wheel portions 312 are rotatably mounted on an axle 314 forming part of an axle assembly 316 illustrated in FIG. 5. The axle assembly 316 is an integrally cast or machined component incorporating the axle 314, a connector pin 318 and an intermediate portion 320 extending between the axle 314 and the connector pin 318. The wheel portions 312 are received on opposite ends of the axle 314 and rotatably held there by means of a snap-fitting. In the assembled configuration illustrated in FIG. 4, the connector pin 318 is disposed between the two wheel portions 312. Furthermore, there is a further gap provided between the connector pin 318 and the wheel portions 312 to receive the dependent connector 308. The connector pin 318 releasably engages with the dependent connector 308 enabling the pin to rotate within the dependent connector 308 about the longitudinal axis of the pin 318. A snap-fit connection may be provided therebetween. In assembled configuration of the leg 300 and the castor 302, only a small clearance need be provided between the underside of the leg 300 and the top of the castor 302. This provides for a compact arrangement of low height (typically less than 65 mm), causing minimal disruption to the movement of the chair occupant's feet under the seat portion.

As can be seen in FIG. 4, a part-cylindrical cover 322 extends between the two wheel portions 312 to partly close the gap therebetween.

FIGS. 6 to 9 show an alternative form of castor 402 which may be used in the wheel assembly of FIG. 2.

Figure 9:
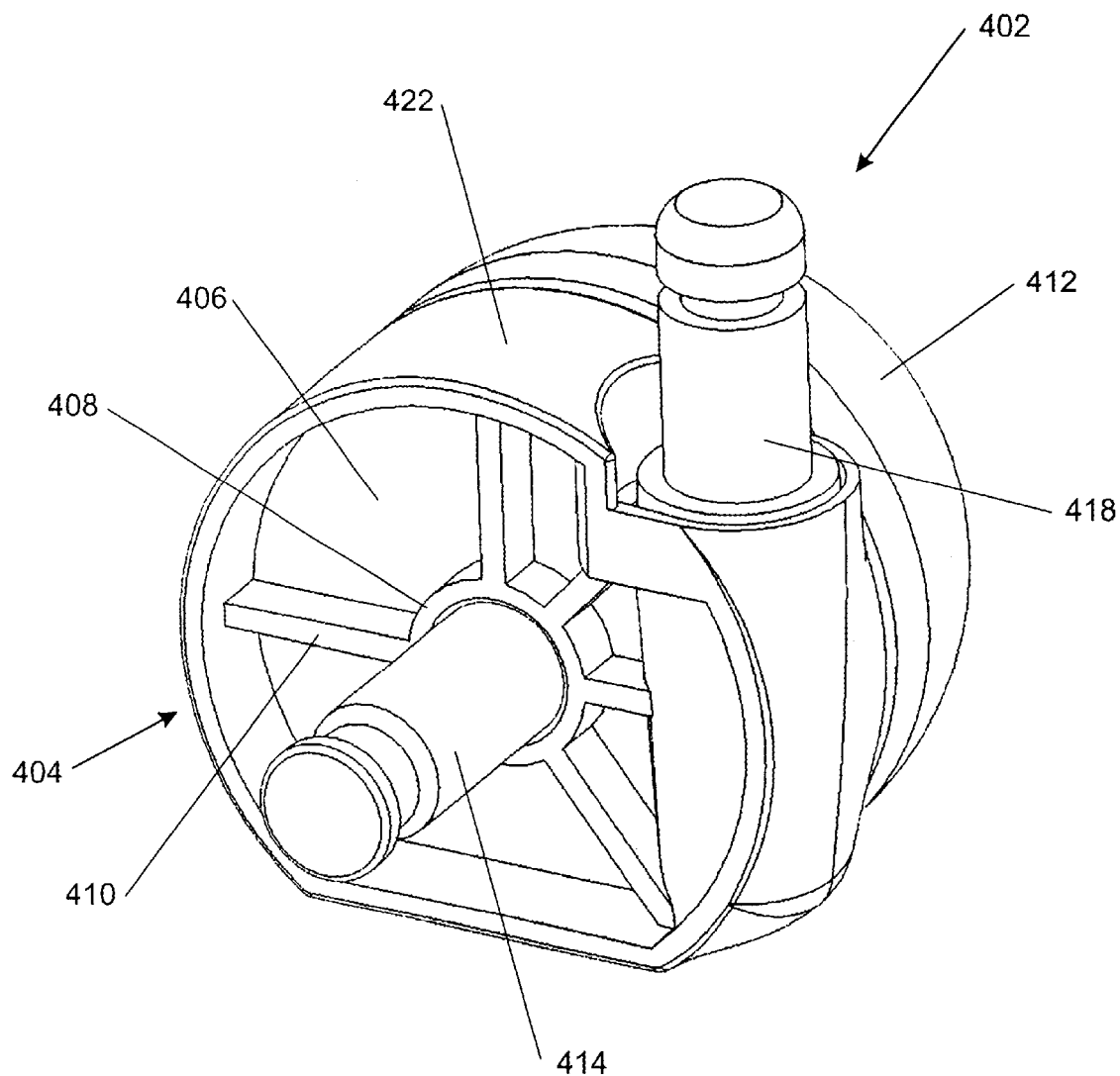
FIG. 9 is a sectioned perspective view of the castor illustrated in FIG. 6.

The castor 402 includes an axle assembly 404 and two spaced wheel portions 412. As shown in FIG. 9, the axle assembly includes body portion having a plate 406 and an annular boss 408 defining an aperture through the plate 406. A plurality of ribs 410 extend radially outwardly from the boss 408, and the outer end of a number of the ribs 410 terminate in a cover 422 which extends between the two wheel portions 412. The outer end of the remaining ribs terminate at a pin 418.

The wheel portions 412 are rotatably mounted on an axle 414 which is mounted in the boss 408. The wheel portions 412 are received on opposite ends of the axle 414 and rotatably held there by means of a snap-fitting. In the assembled configuration shown in FIG. 8, part of the pin 418 is disposed between the two wheel portions 412. There is a gap between the pin 418 and the wheel portions 412 to receive part of the socket or sleeve 308 that extends downwardly from the respective leg 300. It will be appreciated that the socket or sleeve 308 will extend in part between the two wheel portions.

The pin 418 releasably engages with the socket or sleeve 308 enabling the pin to rotate within the socket or sleeve 308 about the longitudinal axis of the pin 418. A snap-fit connection may be provided therebetween.

Figure 5:
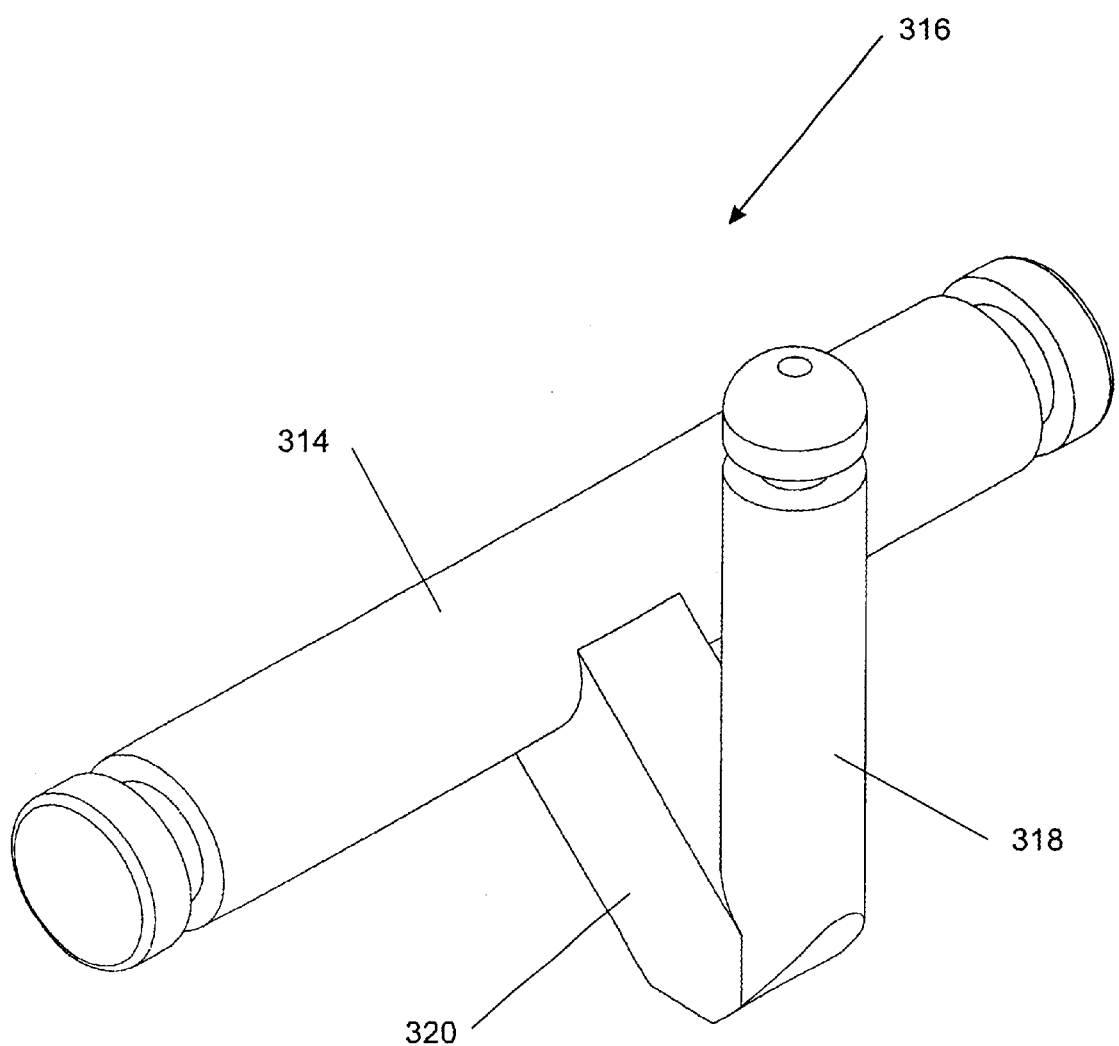
FIG. 5 is a perspective view of an axle assembly forming part of the castor illustrated in FIG. 4.
Figure 6:
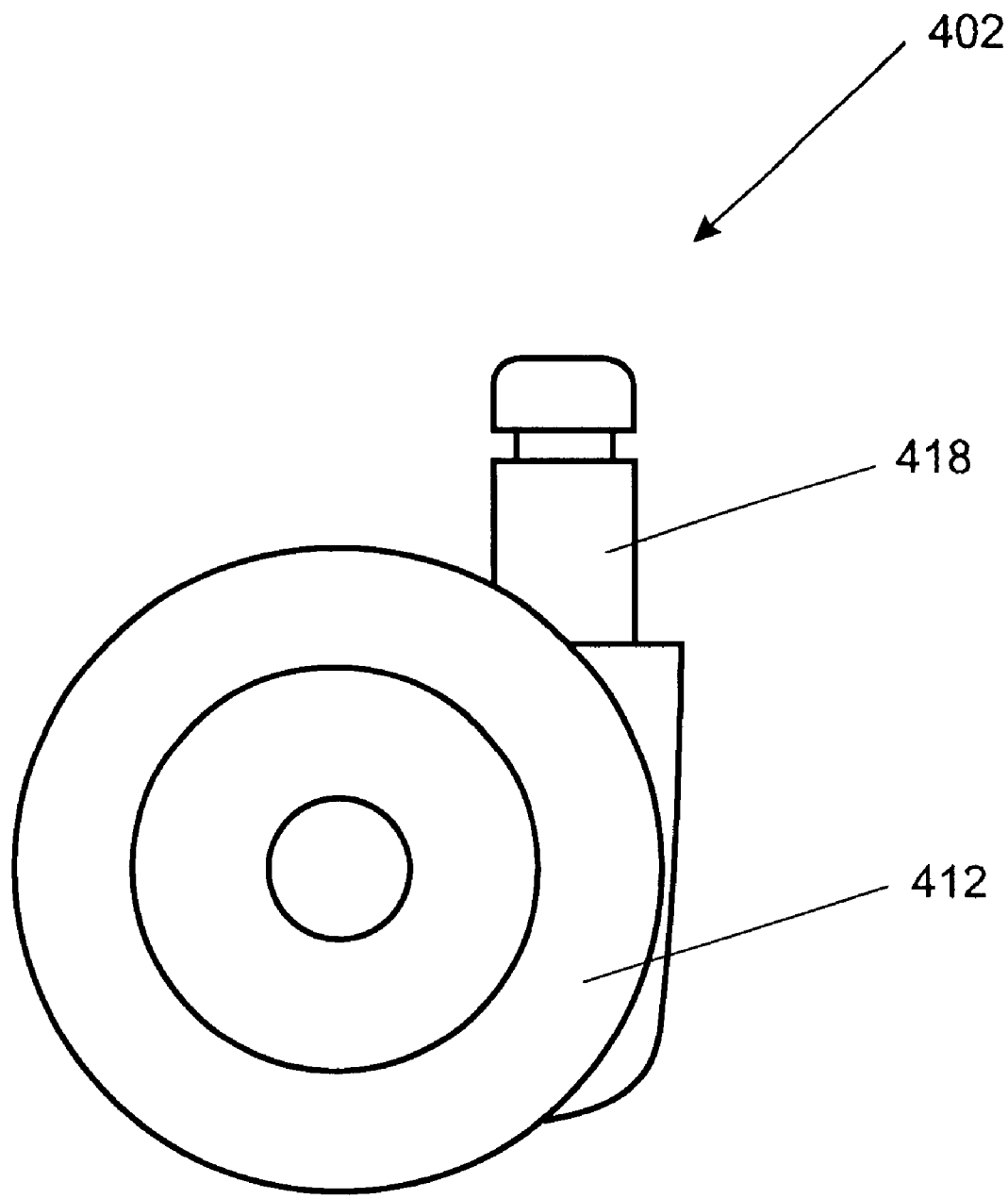
FIG. 6 is a side view of an alternative castor which may form part of the base illustrated in FIGS. 1 to 3.
Figure 7:
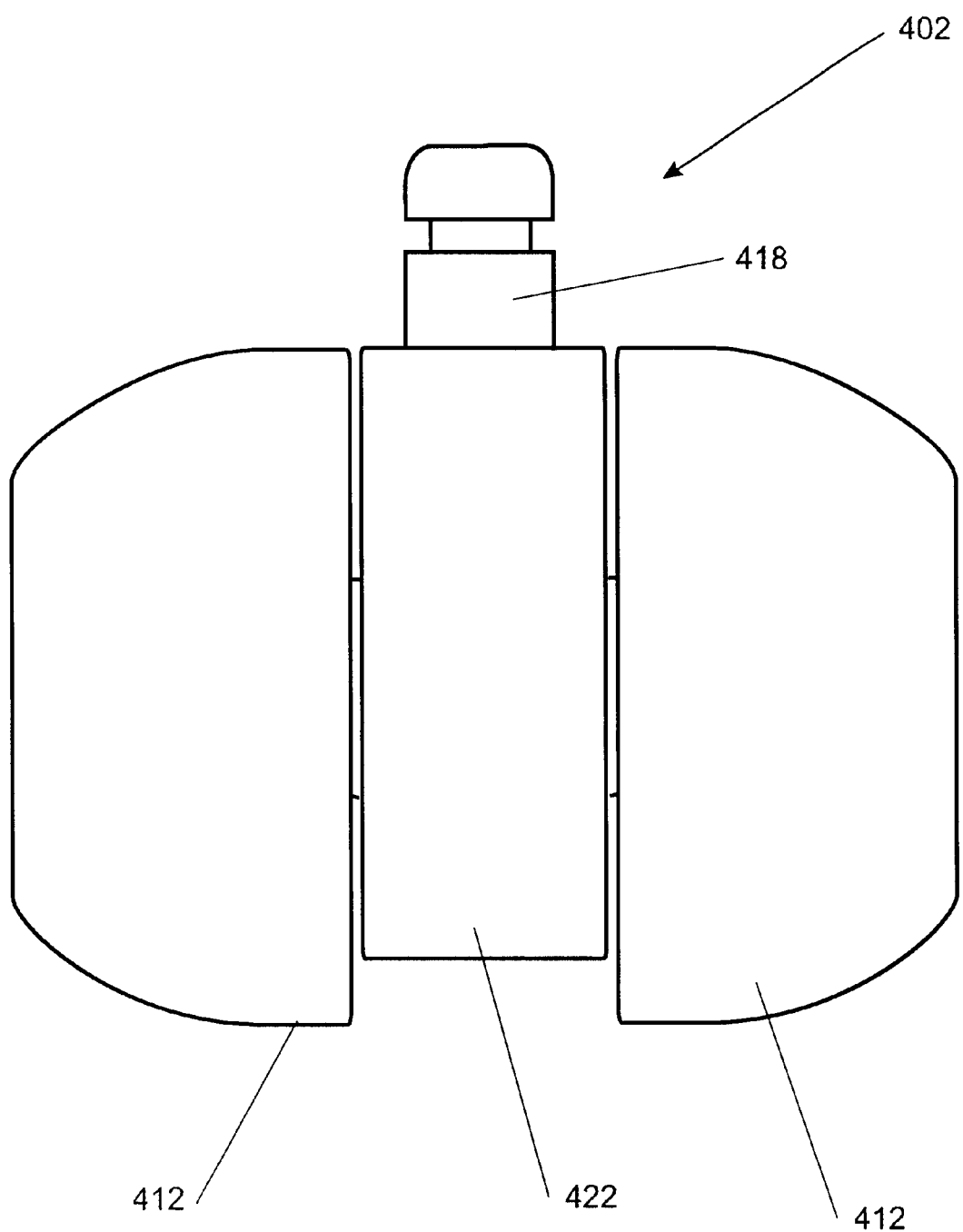
FIG. 7 is a front view of the castor illustrated in FIG. 6.
Figure 8:
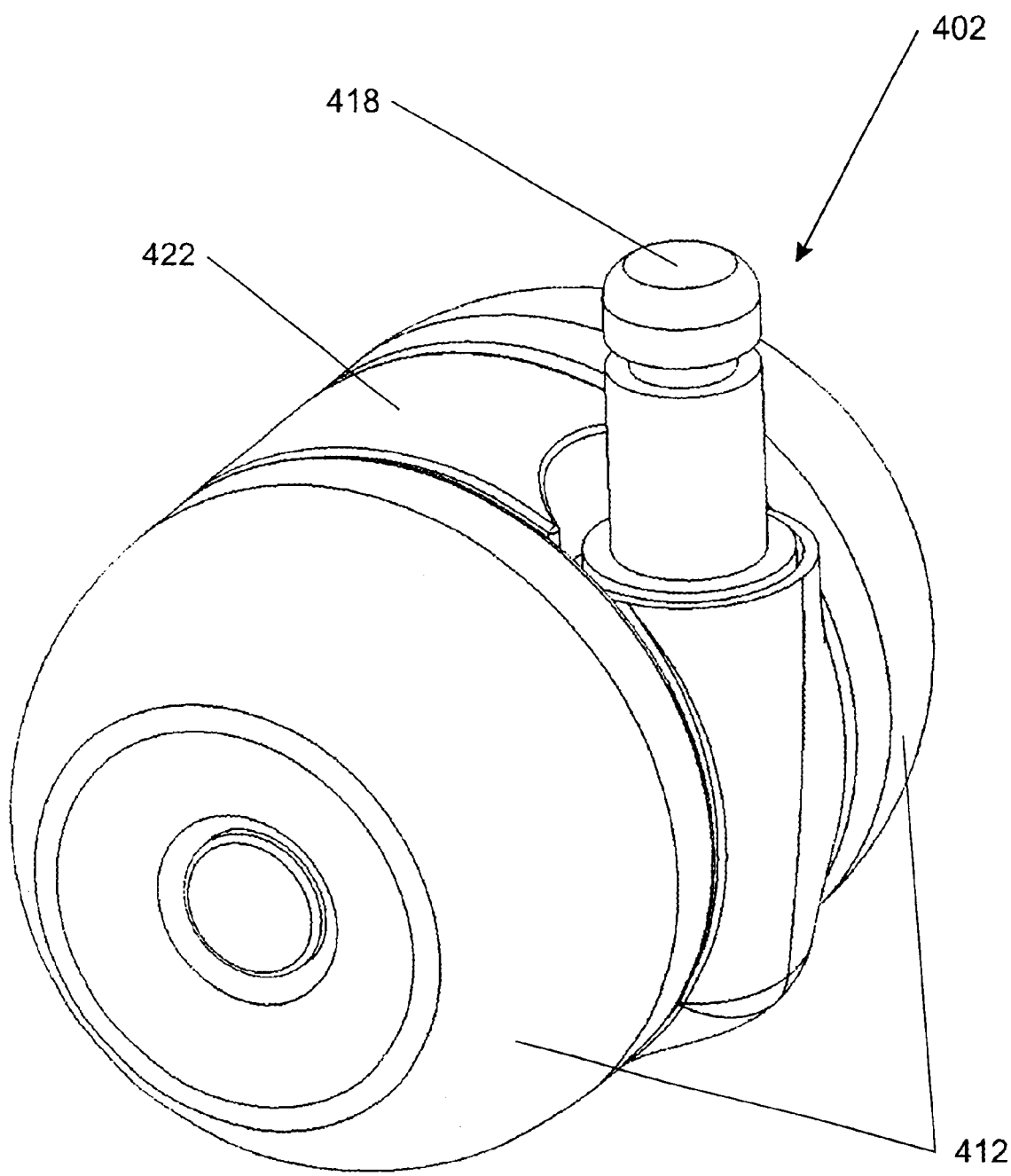
FIG. 8 is a perspective view of the castor illustrated in FIG. 6.

As with the castor illustrated in FIGS. 4 and 5, in the assembled configuration of the leg 300 and the castor 402, only a small clearance need be provided between the underside of the leg 300 and the top of the castor 402. It will be appreciated that, when using either of the preferred types of castors 302 or 402, the downwardly extending sockets or sleeves 308 which extend at least in part between the two wheel portions enable low-profile legs 300 to be used in the base, while still providing the required strength and stability.

The foregoing describes only two embodiments of the present invention and modifications may be made thereto without departing from the scope of the present invention.

What is claimed is:

1. A castored base for a chair comprising:
   a central part with a plurality of legs extending radially outwardly therefrom, each leg having a socket or sleeve fixed thereto adjacent an outer end thereof; and
   a castor connected to each socket or sleeve, each castor having two wheel portions and an axle assembly, the axle assembly including an axle to which the two wheel portions are rotatably mounted in spaced disposition and including a pin; wherein the pin of each castor is received in a respective one of the sockets or sleeves which extends at least in part directly in between the two wheel portions so as to be at least partially bounded by the two wheel portions.

2. The castored base as claimed in claim 1, wherein each pin is releasably received in the respective socket or sleeve.

3. The castored base as claimed in claim 1, further including a central upright support column with the plurality of legs radially extending from the lower end of the support column.

4. The castored base as claimed in claim 1, wherein the radially extending legs extend in a substantially horizontal fashion.

5. The castored base as claimed in claim 4, wherein the legs incorporate a small downward gradient as they extend radially outward.

6. The castored base as claimed in claim 5, wherein the legs incorporate a slight curve.

7. The castored base as claimed in claim 6, wherein the curve is convex upwards.

8. The castored base as claimed in claim 1, wherein the legs are of plate-like construction.

9. The castored base as claimed in claim 8, wherein each leg incorporates a longitudinally extending strengthening web disposed on its underside.

10. The castored base as claimed in claim 9, wherein each strengthening web reduces in height in the radially outward direction along the associated leg.

11. The castored base as claimed in claim 1, wherein each socket or sleeve is an integrally formed part of the respective leg.

12. The castored base as claimed in claim 1, wherein each pin is rotatably mounted within the respective socket/sleeve to rotate about an axis aligned with the longitudinal axis of the pin.

13. The castored base as claimed in claim 1, wherein each pin is disposed centrally relative to the respective axle.

14. The castored base as claimed in claim 1, wherein the longitudinal axis of each pin extends generally orthogonally to the longitudinal axis of the respective axle.

15. The castored base as claimed in claim 14, wherein the longitudinal axis of each pin is offset from the longitudinal axis of the respective axle so that they do not intersect.

16. The castored base as claimed in claim 15, wherein each axle assembly includes an intermediate portion which extends between the axle and the pin.

17. The castored base as claimed in claim 16, wherein the axle, the intermediate portion and the pin is an integrally formed component.

18. The castored base as claimed in claim 17, wherein the component is cast, machined or forged.

19. The castored base as claimed in claim 1, wherein the pin in each castor is disposed substantially between the two wheel portions.

20. The castored base as claimed in claim 19, wherein the top of the pin in its operable configuration extends no higher than level with the top of the wheel portions.

21. The castored base as claimed in claim 1, wherein the axle assembly includes a body portion defining an aperture within which the axle is mounted.

22. The castored base as claimed in claim 21, wherein the body portion includes a plate having a boss defining the aperture, and a plurality of ribs extending radially outwardly from the boss.

23. The castored base as claimed in claim 1, wherein each wheel portion is circular in cross-section transverse to its rolling axis.

24. The castored base as claimed in claim 23, wherein each wheel portion has a rolling surface shaped as a cylinder or a hemisphere.

25. The castored base as claimed in claim 23, wherein each wheel portion has a rolling surface which is semi-ellipsoidal.

26. The castored base as claimed in claim 23, wherein each wheel portion is of solid, translucent plastic construction.

27. The castored base as claimed in claim 1, wherein each castor further includes a cover extending between the two wheel portions to at least partly close the gap therebetween.

28. The castored base as claimed in claim 27, wherein the cover is an integral part of the axle assembly.

* * * * *